United States Patent [19]

Zwick

[11] Patent Number: 4,760,516

[45] Date of Patent: Jul. 26, 1988

[54] PERIPHERAL INTERRUPT INTERFACE FOR MULTIPLE ACCESS TO AN INTERRUPT LEVEL

[75] Inventor: Nicholas Zwick, East Hanover, N.J.

[73] Assignee: Dialogic Corporation, Parsippany, N.J.

[21] Appl. No.: 934,714

[22] Filed: Nov. 25, 1986

[51] Int. Cl.⁴ .................................................. G06F 9/46
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,290,658 | 12/1966 | Callahan et al. | 364/200 |
| 3,881,174 | 4/1975 | Barnich | 364/200 |
| 4,250,546 | 2/1981 | Boney et al. | 364/200 |
| 4,268,904 | 5/1981 | Suzuki et al. | 364/200 |
| 4,313,160 | 1/1982 | Kaufman et al. | 364/200 |
| 4,326,249 | 4/1982 | Godsey | 364/200 |
| 4,523,277 | 6/1985 | Schnathorst | 364/200 |
| 4,631,670 | 12/1986 | Bradley et al. | 364/200 |

*Primary Examiner*—Raulfe B. Zache
*Attorney, Agent, or Firm*—Michael B. Einschlag

[57] ABSTRACT

Circuitry which permits a plurality of peripherals to share a single interrupt signal line in computer systems and thereby increase the number of peripherals which can be supported.

7 Claims, 1 Drawing Sheet

PERIPHERAL INTERRUPT INTERFACE FOR MULTIPLE ACCESS TO AN INTERRUPT LEVEL

TECHNICAL FIELD

The present invention relates to digital computer systems utilizing peripherals connected to a central processing unit and, more particularly, to peripheral associated apparatus which permits a plurality of peripherals to share a single interrupt signal line.

BACKGROUND OF THE INVENTION

Bus-type channels are often used to connect a plurality of peripheral devices, such as keyboards, printers, modems and the like, to a digital computer. Each peripheral device connected to the bus receives all of the information transmitted by the central computer but only responds to those signals on the bus which are prefixed with the device's unique address. When one of the peripheral devices has information to transmit to the central processing unit (CPU), it typically produces a low to high or logical "0" to logical "1" transition on an interrupt signal line. Such signalling is commonly referred to as active high, edge-triggered interrupt signalling. When the CPU reaches a point in its operation when it can respond to the interrupt request, it acknowledges the interrupt by sending a signal on another control line. The interrupting peripheral, upon receiving this acknowledgment signal, begins a sequence which results in the transmission of the desired information from the peripheral to the computer.

While the above-described interrupt signal routine has long been used, many computer systems were designed to only support a limited number of interrupt signal lines. This limitation can, at times, place a severe constraint on the ability of such systems to incorporate more peripheral devices. Accordingly, apparatus which permits more than one peripheral device to share a signal interrupt signal line and thereby increase the number of peripherals which can be supported would be extremely desirable.

SUMMARY OF THE INVENTION

The present invention overcomes the limitations of the prior art by allowing a single interrupt signal line to be shared among a plurality of peripherals. In accordance with the present invention, circuitry is disposed between an interrupt signal line and each of the peripherals connected to this line. This circuitry includes a first portion which provides a transition from a first to a second voltage level in response to an interrupt signal pulse received from the associated peripheral. The second voltage level is then maintained until a clear interrupt signal is applied to the circuitry. A second portion of the circuitry responds to this clear interrupt signal to rapidly pull the interrupt signal line back to the first voltage level. This first voltage level clears the signal interrupt line thereby permitting interrupt signalling by other peripherals.

One advantage of the present invention is that it can be economically implemented. Another advantage is that it is readily installable in a computer system. Still another advantage of the present invention is that it rapidly responds to the applied control signals and thereby doesn't significantly degrade the operating speed of the computer system.

BRIEF DESCRIPTION OF THE DRAWING

The principles of the present invention may be clearly understood by considering the following detailed description in conjunction with the accompanying drawing, in which.

DETAILED DESCRIPTION

Figure 1:
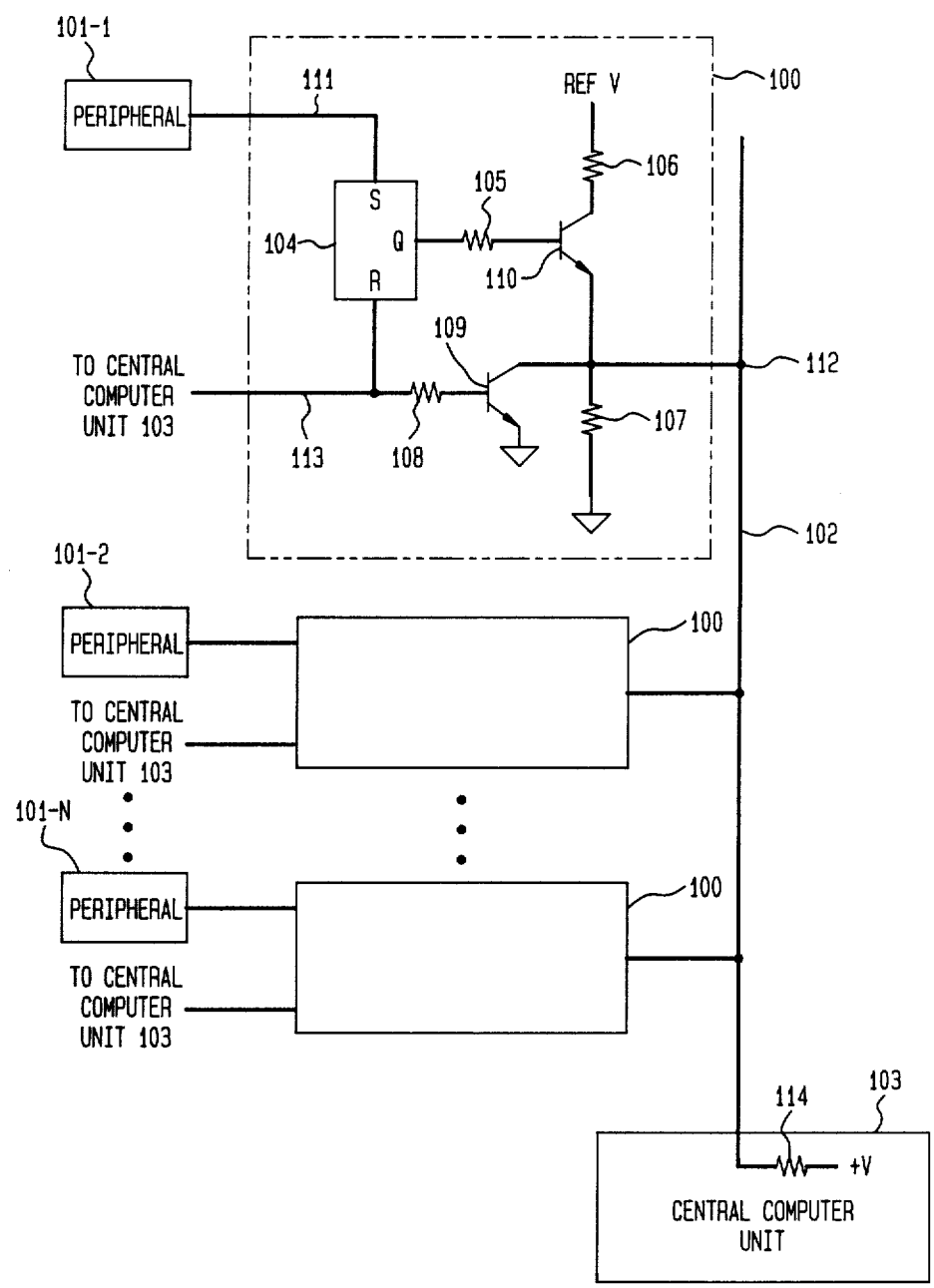
FIG. 1 is a detailed schematic diagram of an embodiment of the peripheral interrupt interface of the present invention a multiplicity of which are used to connect a multiplicity of peripheral units to a single interrupt level of a computer system.

FIG. 1 shows a plurality of identical circuits 100 fabricated in accordance with the present invention. The use of these circuits permits a plurality of peripherals, 101-1 through 101-N, to share a common interrupt signal line 102 which extends from central computer unit 103. It should, of course, be understood that there are other interconnections between the peripherals and central computer unit 103 which have not been shown for purposes of simplicity. Each of the circuits 100 interfaces a different peripheral with common interrupt signal line 102. Such peripherals may all be similar or can include a mix of different apparatus, such as printers, keyboards, modems, cathode ray tubes, and the like.

In the disclosed embodiment, central computer unit 103 is the type which uses active high, edge-triggered interrupt signalling. With such signalling, an interrupt request is indicated by a low to high transition of the interrupt signal line. Such asynchronous signalling is used in many personal computers, such as the IBM PC, including the XT and AT models, and the various compatible clones produced by other manufacturers.

Circuit 100 includes a set-reset flip-flop 104, resistors 105-108, and NPN transistors 109 and 110. When a peripheral has information to send to the central computer unit 103, a pulse is coupled to the set (S) lead of flip-flop 104 via lead 111. This pulse sets the ouput lead (Q) of the flip-flop at a high or logical "1" level which creates the necessary low-to-high transition of interrupt signal line 102 for active high, edge-triggered signalling. Specifically, the logical "1" level turns transistor 110 on and current flows from a reference voltage through resistor 106, transistor 110 and thence through resistor 107 to a second reference potential, i.e., ground. Resistor 105 limits the base current of transistor 110. The voltage at node 112, created in response to the pulse on lead 111, is approximately 0.8 volts less than the voltage appearing at the Q output terminal of flip-flop 104. This voltage is automatically maintained, even after the set interrupt pulse ceases, until a clear interrupt pulse is coupled to the reset (R) lead of flip-flop 104 via lead 113. The clear interrupt pulse typically originates from the central computer unit after the latter acknowledges a peripheral's request to send information, as indicated by the low to high transition of the signal interrupt line.

The clear interrupt signal coupled to the R lead of flip-flop 104 turns transistor 110 off and resistor 107 pulls node 112 to the logic "0". To create an unambiguous high to low transition, the clear interrupt pulse is also used to turn transistor 109 on. Resistor 108 limits the current applied to the base current of transistor 109. With transistor 109 on, a current flow is established from a voltage reference in the central computer unit through pull-up resistor 114 and transistor 109 to the second reference potential, i.e., ground. Accordingly, node 112 is shunted to ground, i.e., the logic "0" state.

Once the clear interrupt pulse ceases, transistor 109 turns off and node 112 is released to its passive state and signal interrupt line 102 is again ready to communicate an interrupt signal to the central computer unit from any of the peripherals 101-1 through 101-N by assuming a logic "1" state.

Note that as long as resistor 107 exists in at least one of the circuits 100, the inventive apparatus will operate as described above. However, in a preferred embodiment, resistor 107 is present in only one of the circuits 100. Such a configuration is advantageous because power consumption is reduced.

The above-described circuitry is particularly attractive for use in personal computers, can provide transistor to transistor logic levels and can be used to couple up to 8 peripherals to a single signal interrupt line. It allows for any of the peripherals to asynchronously signal a request for service through the interrupt signal line at any time.

It should, of course, be understood that while the present invention has been disclosed in reference to a single embodiment, other arrangements may be apparent to those skilled in the art without departing from the spirit and scope of the present invention.

What is claimed is:

1. Apparatus connected between a peripheral and an interrupt signal line in a computer system, said apparatus comprising:
    first means having an output connected to said interrupt signal line and being responsive to a first control signal from said peripheral for providing a transition from a first to a second voltage at said interrupt signal line, said first means once enabled also maintaining said second voltage at said interrupt signal line, said first means being further responsive to a second control signal from said computer system for disabling said first means; and
    second means having an output connected to said interrupt signal line and being responsive to said second control signal for driving said interrupt signal line back to said first voltage.

2. Apparatus connected between a peripheral and an interrupt signal line in a computer system, said apparatus comprising:
    a flip flop having first and second input terminals and an output terminal, said first input terminal being responsive to a first control signal from the peripheral and said second input terminal being responsive to a second control signal from said computer system;
    a first transistor connected to said flip-flop output terminal, said first transistor having emitter and collector terminals, said emitter terminal being connected to said interrupt signal line;
    a first resistor connected between said first transistor collector terminal and a first reference potential;
    a second resistor connected between said interrupt signal line and a second reference potential, whereby said interrupt signal line is driven from said second reference potential to a voltage in response to said first control signal; and
    second means having an output connected to said interrupt signal line and being responsive to said second control signal for driving said interrupt signal line back to said second reference potential.

3. The apparatus of claim 2 wherein said flip-flop is of the set-reset type.

4. The apparatus of claim 2 wherein said first control signal produces a first logic level at said flip-flop output terminal which turns said first transistor on thereby establishing a current flow from said first reference potential through said first and second resistors to said second reference potential.

5. The apparatus of claim 2 wherein the second means comprises a second transistor responsive to the second control signal, the second transistor having collector and emitter terminals respectively connected to said interrupt signal line and said second reference potential.

6. The apparatus of claim 5 wherein said second control signal produces a second logic level at said flip-flop output which turns said first transistor off and turns said second transistor on thereby shunting said signal interrupt line to said second reference potential.

7. Apparatus connected between a multiplicity of peripherals and an interrupt signal line in a computer system, said apparatus comprising:
    at least one interface apparatus connected between one of said multiplicity of peripherals and said interrupt signal line which comprises:
        a flip-flop having first and second input terminals and an output terminal, said first input terminal being responsive to a first control signal from said one of said multiplicity of peripherals and said second input terminal being responsive to a second control signal from said computer system;
        a first transistor connected to said flip flop output terminal, said first transistor having emitter and collector terminals, said emitter terminal being connected to said interrupt signal line;
        a first resistor connected between said first transistor collector terminal and a first reference potential;
        a second resistor connected between said interrupt signal line and a second reference potential, whereby said interrupt signal line is driven from said second reference potential to a voltage in response to said first control signal; and
        second means having an output connected to said interrupt signal line and being responsive to said second control signal for driving said interrupt signal line back to said second reference potential;
    and at least one further interface apparatus connected between another one of said multiplicity of peripherals and said interrupt signal line which comprises:
        a flip flop having first and second input terminals and an output terminal, said first input terminal being responsive to a first control signal from said another one of said multiplicity of peripherals and said second input terminal being responsive to another second control signal from said computer system;
        a first transistor connected to said flip flop output terminal, said first transistor having emitter and collector terminals, said emitter terminal being connected to said interrupt signal line;
        a first resistor connected between said first transistor collector terminal and a first reference potential;
        said emitter terminal also being connected to said second reference potential, whereby said interrupt signal line is driven from said second reference potential substantially to said voltage in response to said first control signal; and
        second means having an output connected to said interrupt signal line and being responsive to said another second control signal for driving said interrupt signal line back to said second reference potential.

* * * * *